(12) United States Patent
Xue et al.

(10) Patent No.: US 11,295,419 B2
(45) Date of Patent: Apr. 5, 2022

(54) DISTORTION CORRECTION METHOD AND APPARATUS, ELECTRONIC DEVICE, AND COMPUTER-READABLE STORAGE MEDIUM

(71) Applicant: BOE TECHNOLOGY GROUP CO., LTD., Beijing (CN)

(72) Inventors: Ruibin Xue, Beijing (CN); Tingting Wang, Beijing (CN); Zhenxing Hao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/945,336

(22) Filed: Jul. 31, 2020

(65) Prior Publication Data
US 2021/0097653 A1  Apr. 1, 2021

(30) Foreign Application Priority Data
Sep. 29, 2019 (CN) .......................... 201910946074.7

(51) Int. Cl.
*G06T 7/73* (2017.01)
*G06T 5/00* (2006.01)
*G06T 7/00* (2017.01)

(52) U.S. Cl.
CPC ............ *G06T 5/006* (2013.01); *G06T 7/0002* (2013.01); *G06T 7/73* (2017.01); *G06T 2207/20021* (2013.01); *G06T 2207/20221* (2013.01)

(58) Field of Classification Search
CPC ......... G06T 5/006; G06T 7/73; G06T 7/0002; G06T 7/13
See application file for complete search history.

(56) References Cited

U.S. PATENT DOCUMENTS

| 2005/0024597 A1* | 2/2005 | Kubo | H04N 9/3185 |
| | | | 353/69 |
| 2010/0014716 A1* | 1/2010 | Chae | G06K 9/00704 |
| | | | 382/113 |

(Continued)

FOREIGN PATENT DOCUMENTS

| CN | 102930515 A | 2/2013 |
| CN | 105046657 A | 11/2015 |

(Continued)

OTHER PUBLICATIONS

First Office Action dated Nov. 15, 2021 corresponding to Chinese application No. 201910946074.7.

*Primary Examiner* — Sam Bhattacharya
(74) *Attorney, Agent, or Firm* — Nath, Goldberg & Meyer; Joshua B. Goldberg

(57) ABSTRACT

The present disclosure provides a distortion correction method, a distortion correction apparatus, an electronic device, and a computer-readable storage medium, the distortion correction method including: performing a line detection on the distorted image to obtain multiple straight lines in the distorted image; grouping the straight lines into multiple groups of straight lines; selecting optimal boundary lines of the distorted image from the groups of straight lines; determining multiple initial vertexes of the distorted image according to intersection points between the optimal boundary lines; and performing a perspective transformation processing on the distorted image according to the initial vertexes to obtain a corrected image.

20 Claims, 7 Drawing Sheets

(56) References Cited

U.S. PATENT DOCUMENTS

2019/0102910 A1* 4/2019 Kaneko ................ H04N 17/002
2020/0145630 A1* 5/2020 Doh ..................... H04N 9/3129

FOREIGN PATENT DOCUMENTS

| CN | 106127701 A | 11/2016 |
| CN | 108564557 A | 9/2018 |
| CN | 108805124 A | 11/2018 |
| CN | 109409366 A | 3/2019 |
| CN | 109410140 A | 3/2019 |

* cited by examiner

DISTORTION CORRECTION METHOD AND APPARATUS, ELECTRONIC DEVICE, AND COMPUTER-READABLE STORAGE MEDIUM

CROSS-REFERENCE TO RELATED APPLICATIONS

The present disclosure claims the priority of Chinese Patent Application No. 201910946074.7, filed on Sep. 29, 2019, the contents of which are incorporated herein in their entirety by reference.

TECHNICAL FIELD

The present disclosure relates to the field of image processing technology, and in particular, to a distortion correction method, a distortion correction apparatus, an electronic device, and a computer-readable storage medium.

BACKGROUND

When an image or a video is taken, due to limitation of factors such as a taking angle or a taking position, the image often has a distortion, resulting in that it is very inconvenient for viewers to view or to perform a subsequent processing (for example, for extracting features of the image, or image recognition) on the image. Therefore, in order to obtain a high-quality image, it is necessary to correct the image having the distortion. However, most of conventional distortion correction methods require manual intervention during correcting the image, and otherwise a corrected image still having significant distortion is easily obtained.

SUMMARY

The present disclosure discloses a distortion correction method, the method including:
performing a line detection on a distorted image to obtain multiple straight lines in the distorted image;
grouping the straight lines into multiple groups of straight lines;
selecting optimal boundary lines of the distorted image from the groups of straight lines;
determining multiple initial vertexes of the distorted image according to intersection points between the optimal boundary lines;
performing a perspective transformation processing on the distorted image according to the initial vertexes to obtain a corrected image.

In some implementations, the optimal boundary lines include an optimal upper boundary line, an optimal lower boundary line, an optimal left boundary line, and an optimal right boundary line, and the determining the initial vertexes of the distorted image according to the intersection points between the optimal boundary lines includes:
determining the intersection point of the optimal left boundary line and the optimal upper boundary line as an upper left initial vertex, determining the intersection point of the optimal upper boundary line and the optimal right boundary line as an upper right initial vertex, determining the intersection point of the optimal right boundary line and the optimal lower boundary line as a lower right initial vertex, and determining the intersection point of the optimal lower boundary line and the optimal left boundary line as a lower left initial vertex.

In some implementations, the determining the initial vertexes of the distorted image according to the intersection points between the optimal boundary lines includes:
calculating a total number of intersection points between every two of the optimal boundary lines;
determining the initial vertexes of the distorted image from the intersection points according to the total number of the intersection points and a preset rule.

In some implementations, the intersection points include a first intersection point and a second intersection point, the first intersection point and the second intersection point are obtained by intersecting identical two of the optimal boundary lines, and the calculating the total number of intersection points between every two of the optimal boundary lines includes:
calculating a first distance between the first intersection point and the second intersection point;
in response to that the first distance is smaller than or equal to a distance threshold value, merging the first intersection point and the second intersection point into one intersection point.

In some implementations, the performing the line detection on the distorted image to obtain the straight lines in the distorted image includes:
performing the line detection on the distorted image by adopting a line segment detector (LSD) to obtain the straight lines in the distorted image.

In some implementations, the grouping the straight lines into multiple groups of straight lines includes:
dividing the straight lines into an upper straight line group, a lower straight line group, a left straight line group and a right straight line group by taking a center of the distorted image as a boundary point, wherein the upper straight line group includes a first straight line, the lower straight line group includes a second straight line, the left straight line group includes a third straight, line, and the right straight line group includes a fourth straight line;
the selecting the optimal boundary lines of the distorted image from the groups of straight lines includes:
calculating combination parameters corresponding to a combination of the first straight line, the second straight line, the third straight line and the fourth straight line, wherein the combination parameters include at least one of following parameters: a parallelism between the first straight line and the second straight line, a parallelism between the third straight line and the fourth straight line, an area of a graph formed by the first straight line, the second straight line, the third straight line and the fourth straight line, and a matching degree between the graph and a preset graph;
performing a weighted summation on the combination parameters to obtain a combination score;
taking the combination with the combination score reaching a first preset threshold value as an optimal boundary line combination, wherein the first straight line in the optimal boundary line combination is the optimal upper boundary line, the second straight line is the optimal lower boundary line, the third straight line is the optimal left boundary line, and the fourth straight line is the optimal right boundary line.

In some implementations, the method further includes:
before the dividing the straight lines into the upper straight line group, the lower straight line group, the left straight line group, and the right straight line group by taking the center of the distorted image as the boundary point, dividing the straight lines into a horizontal group and a vertical group according to an included angle between each of the straight lines and a horizontal axis;

calculating an included angle between any two straight lines in each of the horizontal group and the vertical group;

in response to that the included angle between the two straight lines is smaller than or equal to a second preset threshold value, calculating a second distance between the two straight lines;

in response to that the second distance is smaller than or equal to a third preset threshold, merging the two straight lines into one straight line;

the dividing the straight lines into the upper straight line group, the lower straight line group, the left straight line group, and the right straight line group by taking the center of the distorted image as the boundary point includes:

after the merging, dividing the horizontal group into the upper straight line group and the lower straight line group and dividing the vertical group into the left straight line group and the right straight line group by taking the center of the distorted image as the boundary point.

In some implementations, the performing a perspective transformation processing on the distorted image according to the initial vertexes to obtain the corrected image includes:

determining an aspect ratio of the corrected image according to the initial vertexes;

determining target vertexes in one-to-one correspondence with the initial vertexes according to the aspect ratio;

performing the perspective transformation processing on the distorted image according to the initial vertexes and the target vertexes to obtain the corrected image.

In some implementations, the determining the aspect ratio of the corrected image according to the initial vertexes includes:

determining multiple side lengths of the distorted image according to positions of the initial vertex;

determining the aspect ratio according to the side lengths and an included angle between the distorted image and the horizontal axis.

In some implementations, the determining the aspect ratio according to the side lengths and the included angle between the distorted image and the horizontal axis includes:

determining an initial height and an initial width of the distorted image according to the side lengths;

correcting the initial height and the initial width according to the included angle between the distorted image and the horizontal axis to obtain a corrected height and a corrected width;

determining a ratio of the corrected height to the corrected width as the aspect ratio.

In some implementations, the determining the target vertexes in one-to-one correspondence with the initial vertexes according to the aspect ratio includes:

determining the target vertexes in one-to-one correspondence with the initial vertexes according to the side lengths and the aspect ratio of the distorted image.

In some implementations, the performing perspective transformation processing on the distorted image according to the initial vertexes and the target vertexes includes:

determining a perspective transformation matrix according to positions of the initial vertexes and the target vertexes;

performing perspective transformation processing on the distorted image by adopting the perspective transformation matrix.

The present disclosure further discloses a distortion correction apparatus, the apparatus including:

a line detection element configured to perform a line detection on a distorted image to obtain multiple straight lines in the distorted image;

a line grouping element configured to group the straight lines into multiple groups of straight lines;

a boundary selecting element configured to select optimal boundary lines of the distorted image from the groups of straight lines;

an initial vertex determining element configured to determine multiple initial vertexes of the distorted image according to intersection points between the optimal boundary lines;

a perspective transformation element configured to perform perspective transformation processing on the distorted image according to the initial vertexes to obtain a corrected image.

The present disclosure further discloses an electronic device, which includes:

a processor;

a memory configured to store instructions executable by the processor;

wherein the processor is configured to execute the instructions to implement the distortion correction method described above.

The present disclosure further discloses a computer-readable storage medium storing instructions, which, when executed by a processor of an electronic device, enables the electronic device to perform the distortion correction method described above.

DESCRIPTION OF DRAWINGS

In order to more clearly illustrate technical solutions of embodiments of the present disclosure, drawings used in the description of the embodiments of the present disclosure will be briefly introduced below, it is obvious that the drawings in the following description only show some implementations of the present disclosure, and other drawings may be obtained by those skilled in the art without any creative labor, in the drawings.

DESCRIPTION OF EMBODIMENTS

The present disclosure will be described in further detail with reference to the drawings and detailed description, to make features and advantages of the present disclosure more comprehensible.

In the present disclosure, a distorted image refers to an image obtained by taking a real object (for example, a display or a painting shown in FIGS. 8, 9 and 10) and distorted due to a limitation of a taking angle, a taking position, or the like.

Figure 1:
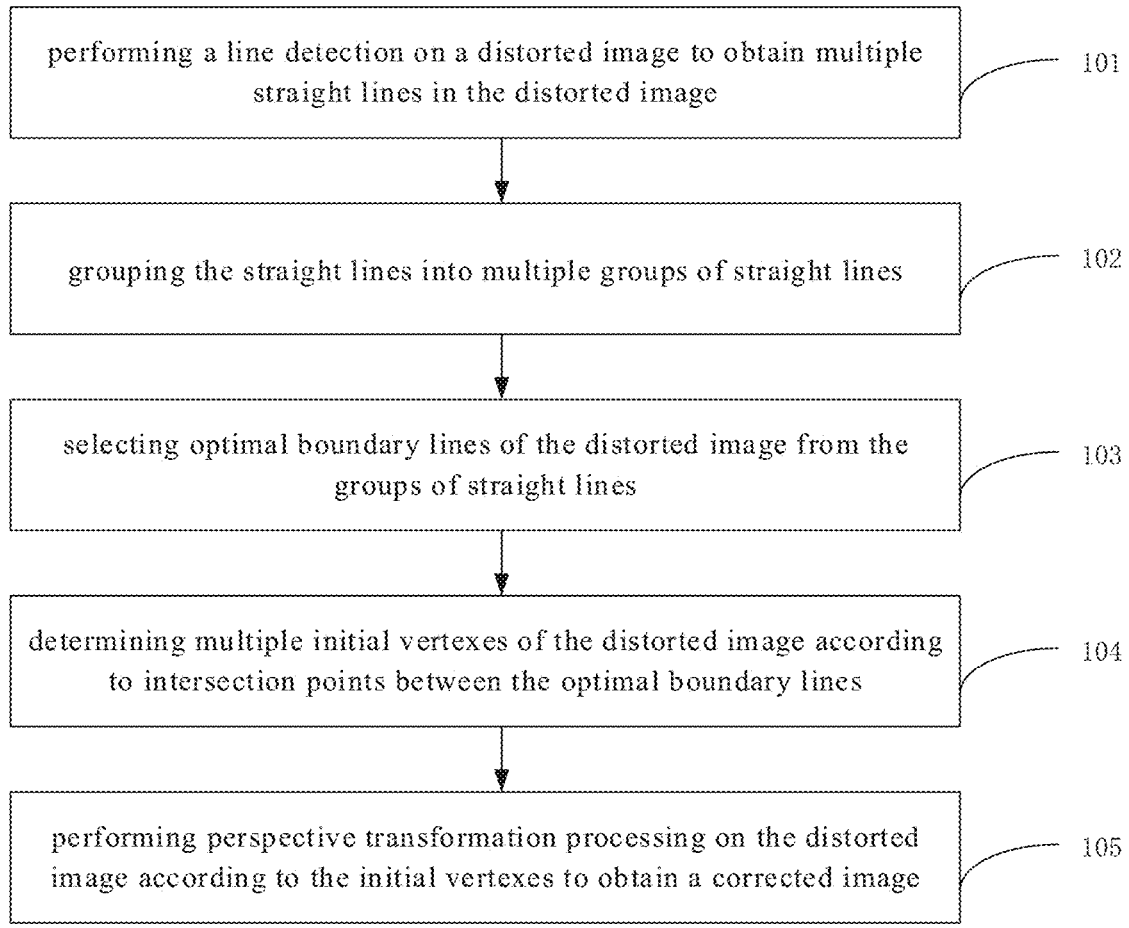
FIG. 1 is a flowchart illustrating steps of a distortion correction method provided by an embodiment of the present disclosure.

An embodiment of the present disclosure provides a distortion correction method, which may include following steps 101 to 105, as shown in FIG. 1.

Step 101: performing a line detection on a distorted image to obtain multiple straight lines in the distorted image.

In specific implementations, various line detection techniques may be used to perform the line detection on the distorted image.

In an implementation, first, various edge detection operators such as Roberts, Sobel, Prewitt, Log, Canny, etc. may be used to perform an edge detection on the distorted image to obtain an edge image, and then Hough transform or Radon transform may be used to perform a line feature extraction on the edge image, so as to obtain the straight lines in the distorted image. Such line detection technique is widely applied, however, under a condition that the distorted image has a complex background, by using Hough transformation or Radon transformation, lines which should not be detected are easily detected by mistake.

In order to make a result of the line detection more accurate, in another implementation, a line segment detector (LSD) may be used to perform the line detection on the distorted image to obtain the straight lines in the distorted image.

Compared with Hough transformation, the LSD is high in speed, does not need to manually set any parameter, does not need to provide the edge image, and achieves a good balance between detection precision and calculation efficiency. The LSD outputs coordinates of two endpoints of each line segment, and takes an output value of −log (NFA) as a score of the line segment.

Attributes of each line segment may include the coordinates of the two endpoints and the score, where the score is used to characterize a probability that the line segment is the straight line. It is more accurate to detect the straight lines by the LSD, the detection speed is fast, and a problem that parameters are uncertain in the line detection by using Hough transformation or Radon transformation is solved.

Step 102: grouping the straight lines into multiple groups of straight lines.

In specific implementations, the straight lines may be divided into a horizontal straight line group and a vertical straight line group, or the straight lines may be divided into four groups, i.e., an upper straight line group, a lower straight line group, a left straight line group and a right straight line group, and so on.

Step 103: selecting optimal boundary lines of the distorted image from the groups of straight lines.

For example, when the straight lines are divided into four groups including the upper straight line group, the lower straight line group, the left straight line group and right straight line group, any straight line may be selected from each group of straight lines, and the optimal boundary lines of the distorted image may be determined based on a parallelism between the selected straight lines, an area of a figure formed of the selected straight lines, and a matching degree between the figure and a preset figure.

Step 104: determining multiple initial vertexes of the distorted image according to intersection points between the optimal boundary lines.

In specific implementations, the initial vertexes may be determined according to a number of intersection points between the optimal boundary, lines of the distorted image and a preset rule for vertex selecting, or the initial vertexes may be determined according to a composition rule of a figure formed by the optimal boundary lines.

Step 105: performing a perspective transformation processing on the distorted image according to the initial vertexes to obtain a corrected image.

In specific implementations, an aspect ratio of the corrected image to be obtained may be determined according to the initial vertexes, and then each of the initial vertexes is corrected according to the aspect ratio to obtain target vertexes in one-to-one correspondence with the initial vertexes; and finally, performing the perspective transformation processing on the distorted image according to the initial vertexes and the target vertexes to obtain the corrected image.

The distortion correction method provided by the embodiment of the present disclosure realizes an automatic correction, selects the straight lines from detected lines by determining the optimal boundary lines and removes interference lines, and determines vertexes of the distorted image according to the optimal boundary lines, so that the corrected image is much similar to the real object, and a quality of the corrected image is improved.

Figure 8:
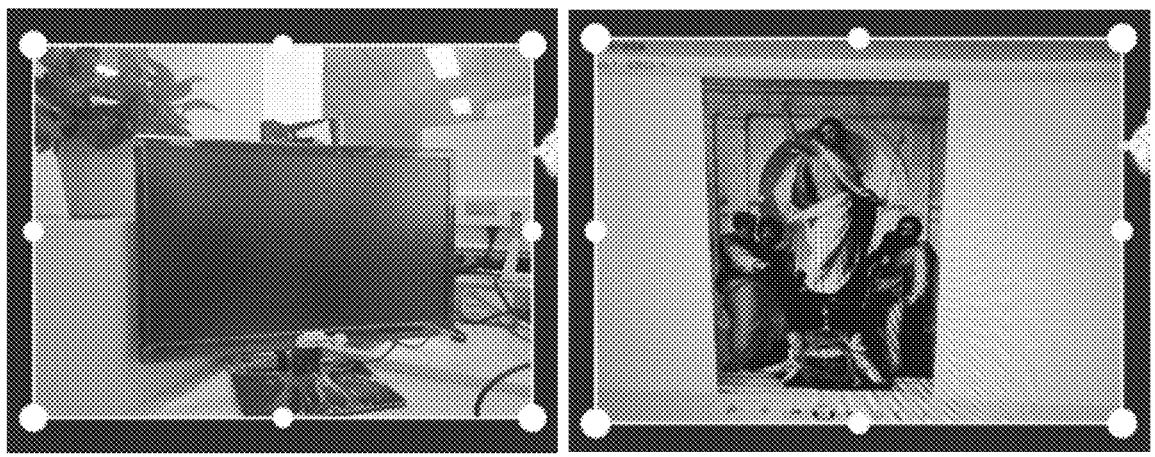
FIG. 8 shows a detection result of ARM v8 platform in an embodiment of the present disclosure.
Figure 9:
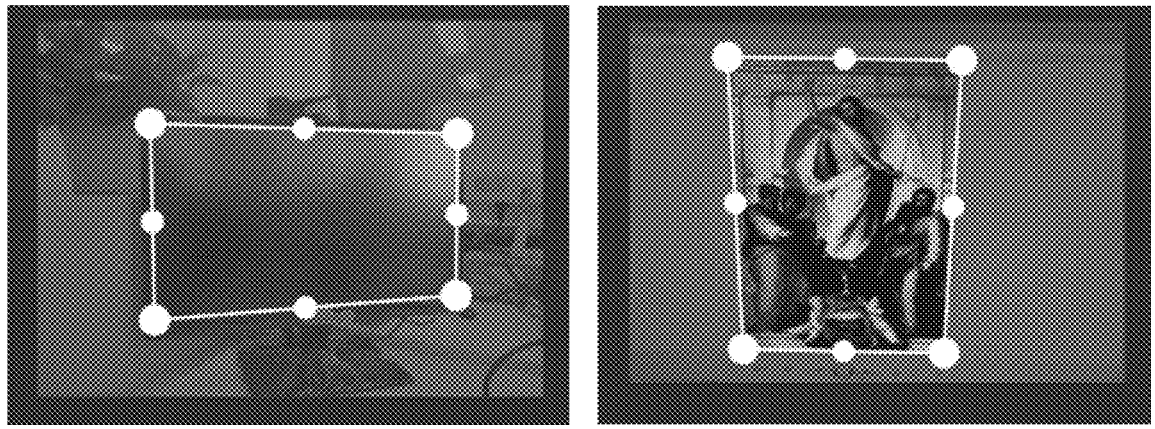
FIG. 9 shows a detection result of ARM v7 platform in an embodiment of the present disclosure.

Inventors found that conventional vertex determination solution has a problem that vertex detection results of different ARM platforms are greatly different, for example, FIG. 8 shows a detection result of an ARM v8 platform, and FIG. 9 shows a detection result of an ARM v7 platform.

In order to solve a problem that vertex detection results of different ARM platforms are greatly different, in an implementation, the optimal boundary lines include an optimal upper boundary line, an optimal lower boundary line, an optimal left boundary line, and an optimal right boundary line, and the step 104 may specifically include:

determining the intersection point of the optimal left boundary line and the optimal upper boundary line as an upper left initial vertex, determining the intersection point of the optimal upper boundary line and the optimal right boundary line as an upper right initial vertex, determining the intersection point of the optimal right boundary line and the optimal lower boundary line as a lower right initial vertex; and determining the intersection point of the optimal lower boundary line and t optimal left boundary line as a lower left initial vertex.

In this implementation, four initial vertexes of the distorted image may be determined according to a composition rule of a quadrilateral. Firstly, the intersection point of the optimal left boundary line lineLeft and the optimal upper boundary line lineTop is calculated as the upper left initial vertex of the quadrilateral; secondly, the intersection point of the optimal upper boundary, line lineTop and the optimal right boundary line lineRight is calculated as the upper right initial vertex of the quadrilateral; thirdly, the intersection point of the optimal right boundary line lineRight and the optimal lower boundary line lineBottom is calculated as the lower right initial vertex of the quadrilateral;

and finally, the intersection point of the optimal lower boundary line lineBottom and the optimal left boundary line lineLeft is calculated as the lower left initial vertex of the quadrilateral.

It should be noted that, in practical applications; the four initial vertexes may not satisfy requirements in a case where the distorted image has the complex background, and the vertexes may be manually fine-adjusted to desired positions.

Figure 10:
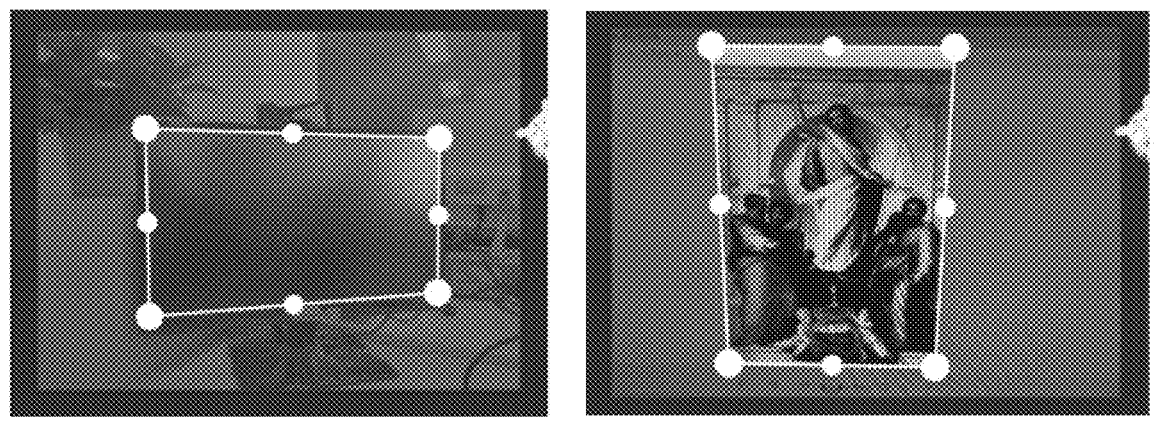
FIG. 10 shows an improved detection result of ARM v8 platform in an embodiment of the present disclosure.

The detection result of the ARM v8 platform in this implementation is shown in FIG. 10 and is consistent with the detection result of the ARM v7 platform, that is, this implementation adopts an improved vertex selection solution, universality for ARM platforms is optimized; and it is not necessary to determine a sequence of the four initial vertexes according to different total numbers of intersection points, so that an amount of codes can be reduced; and an execution efficiency is optimized.

Figure 2:
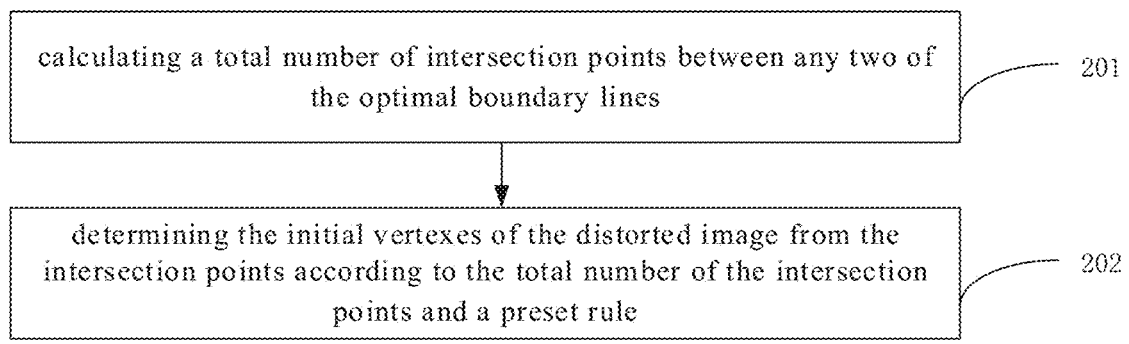
FIG. 2 is a flowchart illustrating steps for determining initial vertexes of a distorted image in an embodiment of the present disclosure.

In order to solve the problem of large difference between the vertex detection results of different ARM platforms, in another implementation, referring to FIG. 2, the step 104 may specifically include step 201 and step 202.

Step 201: calculating a total number of intersection points between any two of the optimal boundary lines.

In a specific implementation, when the intersection points include a first intersection point and a second intersection point, and the first intersection point and the second intersection point are obtained by intersecting identical two of the optimal boundary lines, a first distance between the first intersection point and the second intersection point may be first calculated; and when the first distance is smaller than or equal to the distance threshold, the first intersection point and the second intersection point are merged into one intersection point.

For example, during calculating, there are two intersection points (i.e., the first intersection point and the second intersection point) between an optimal boundary line m and an optimal boundary line n, and when the first distance between the two intersection points is less than or equal to the distance threshold, it is indicated that the two intersection points can be merged into one intersection point, and the merged intersection point may be one of the two intersection points or a midpoint of a connection line between the two intersection points. The distance threshold is the maximum distance between the two intersection points when the two intersection points can be merged into one intersection point, and can be determined according to actual conditions.

Step 202: determining the initial vertexes of the distorted image from the intersection points according to the total number of the intersection points and a preset rule.

Figure 4:
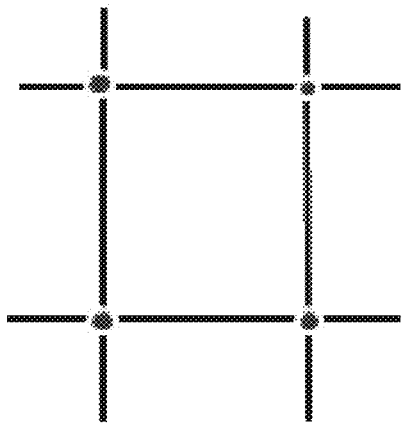
FIG. 4 illustrates a manner for selecting initial vertexes from four intersection points in an embodiment of the present disclosure.
Figure 5:
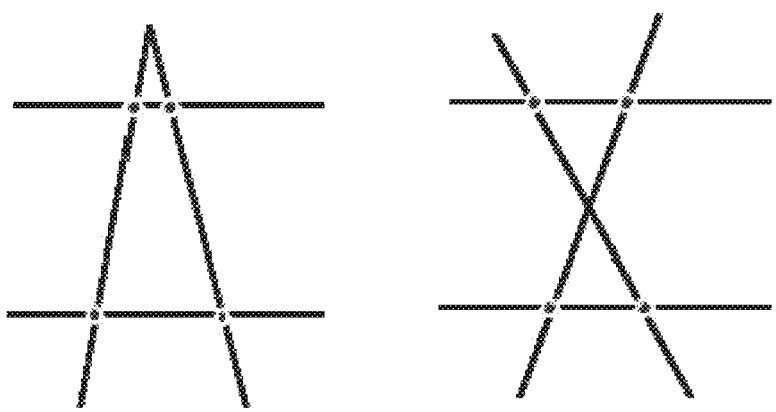
FIG. 5 illustrates a manner for selecting initial vertexes from five intersection points in an embodiment of the present disclosure.
Figure 6:
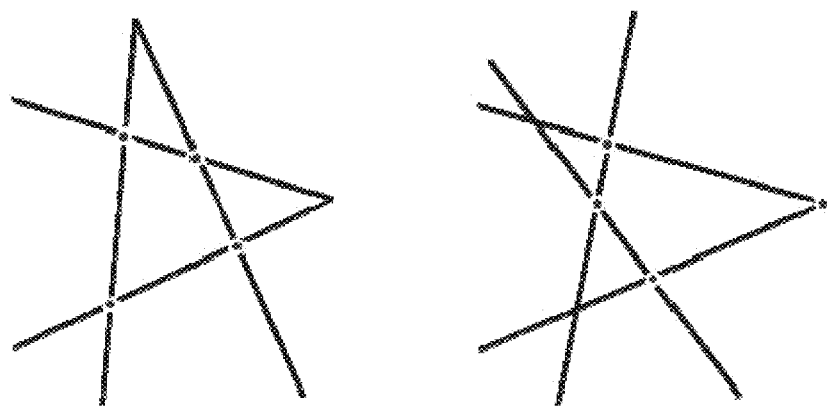
FIG. 6 illustrates a manner for selecting initial vertexes from six intersection points in an embodiment of the present disclosure.

In specific implementations, intersection points, each of which is obtained by intersecting two optimal boundary lines, of the four optimal boundary lines can be calculated without considering a case where there is a common intersection point, and the total number of the intersection points may equal to four, five or six. When the total number of the intersection points is four, two pairs of parallel straight lines are intersected to directly obtain the four intersection points, and the manner for selecting the intersection points is shown in FIG. 4; when the total number of the intersection points is five, there is a pair of parallel straight lines, and the manner for selecting the intersection points is shown in FIG. 5; when the total number of the intersection points is six, no parallel straight lines exist, every two of the straight lines are intersected so that six intersection points are obtained, and four intersection points are selected from the six intersection points according to the manner for selecting the intersection points shown in FIG. 6.

After four intersection points are selected as the initial vertexes, a sequence of the initial vertexes needs to be determined through following steps.

Figure 7:
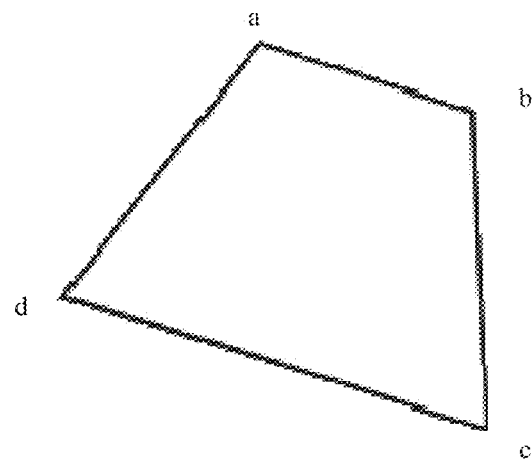
FIG. 7 is a diagram illustrating initial vertexes of a quadrilateral provided by an embodiment of the present disclosure.

Referring to FIG. 7, the four initial vertexes are respectively indicated by a, b, c and d, the initial vertexes a and b are in a straight line line1, the initial vertexes c and d are in a straight line line1'; the initial vertexes a and d are in a straight line line2, and the initial vertexes b and c are in a straight line2', two pairs of straight lines (i.e., linepar1 (line1, line1'), linepair2 (line2, line2')) are obtained. An included angle between the straight line line1 and a horizontal axis equals to θ1, an included angle between the straight line line1' and the horizontal axis equals to θ1', an included angle between the straight line line2 and the horizontal axis equals to θ2, an included angle between the straight line line2' and the horizontal axis equals to θ2', and t1 and t2 are calculated as follows.

$$t1 = |\theta1| + |\theta1'| + |\theta2 - \frac{\pi}{2}| + |\theta2' - \frac{\pi}{2}|$$

$$t2 = |\theta1 - \frac{\pi}{2}| + |\theta1' - \frac{\pi}{2}| + |\theta2| + |\theta2'|$$

When t1>t2, the linepair1 is a horizontal line pair and includes an upper boundary line and a lower boundary line, and the linepair2 is a vertical line pair and includes a left boundary line and a right boundary line; when t1<t2, linepair1 is the vertical line pair and includes the left boundary line and the right boundary line, and linepair2 is the horizontal line pair and includes the upper boundary line and the lower boundary line. Intersection points are calculated from the lines in the linepair1 and the linepair2, resulting in an order of four initial vertexes, labeled as a top left initial vertex pLeftTop, a bottom left initial vertex pLeftBottom, a top right initial vertex pRightTop, and a bottom right initial vertex pRightBottom.

This implementation can eliminate the difference between detection results of different platforms by merging the intersection points with a small enough distance therebetween into one intersection point, and optimize universality for ARM platforms by using an improved manner for selecting initial vertexes.

Figure 3:
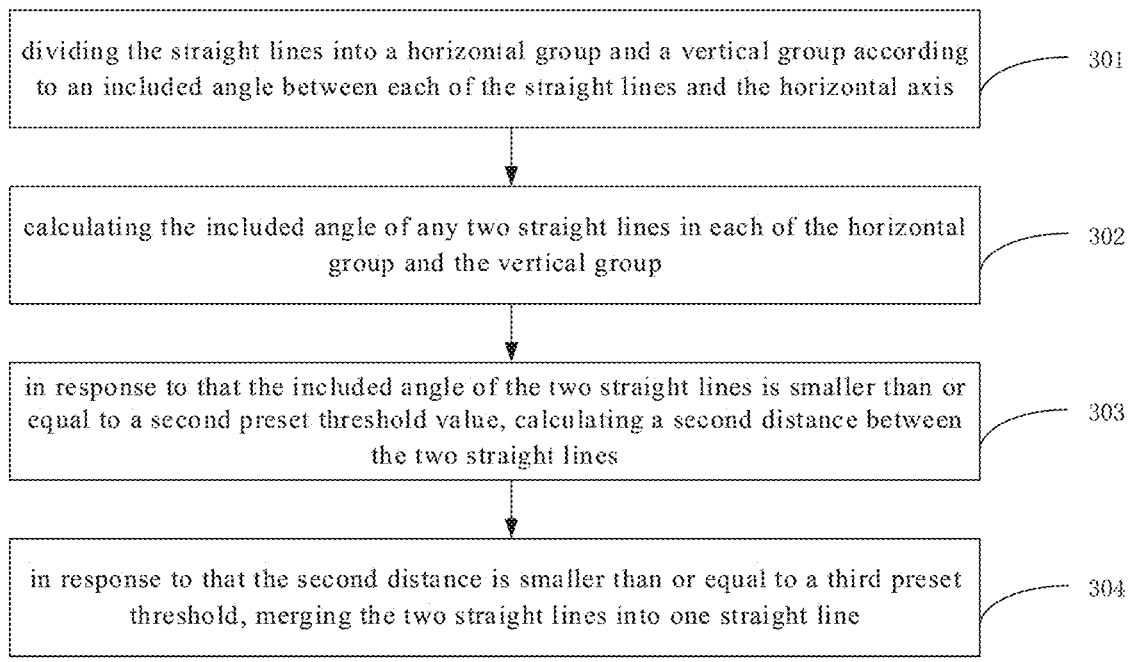
FIG. 3 is a flowchart illustrating a step of merging straight lines obtained by detection according to an embodiment of the present disclosure.

Since a portion of straight lines detected in the step 101 are unnecessary and are interferences, a series of processing needs to be performed on the detected straight lines, and in an implementation, referring to FIG. 3, steps 301 to 304 may be further included before the step 102.

Step 301: dividing the straight lines into a horizontal group and a vertical group according to an included angle between each of the straight lines and the horizontal axis.

In specific implementations, an included angle between each of the straight lines and the horizontal axis may be calculated, in response to that the included angle is in a range from 0 to 45 degrees, the straight line belongs to the horizontal group, and in response to that the included angle is in a range from 45 to 90 degrees, the straight line belongs to the vertical group.

Step 302: calculating the included angle of every two straight lines in each of the horizontal group and the vertical group.

Step 303: in response to that the included angle of the two straight lines is smaller than or equal to a second preset threshold value, calculating a second distance between the two straight lines.

Step 304: in response to that the second distance is smaller than or equal to a third preset threshold, merging the two straight lines into one straight line.

In a particular implementation, operations are performed separately for the vertical group and the horizontal group. Since the LSD is a line segment detector, a long straight line may be detected as multiple line segments, and thus the line segments need to be merged into one straight line. The included angle of every two straight lines in the horizontal group (or vertical group) is calculated, and when the included angle is smaller than or equal to the second preset threshold, it is indicated that the two straight lines are parallel to each other, namely the second preset threshold is the maximum included angle of the two straight lines when the two straight lines can be regarded as being parallel to each other; then, a second distance between the two parallel straight lines is calculated, and when the second distance is smaller than or equal to a third preset threshold, the two parallel straight lines are merged into one straight line, that is, the third preset threshold is the maximum distance between the two parallel straight lines when the two parallel straight lines can be merged into one straight line, for example, the straight line with a longer length can be used to represent the two straight lines (merged into one), and a score of the merged straight line is obtained by adding scores of the two straight lines together. The second preset threshold and the third preset threshold may be determined according to actual conditions.

Figure 11:
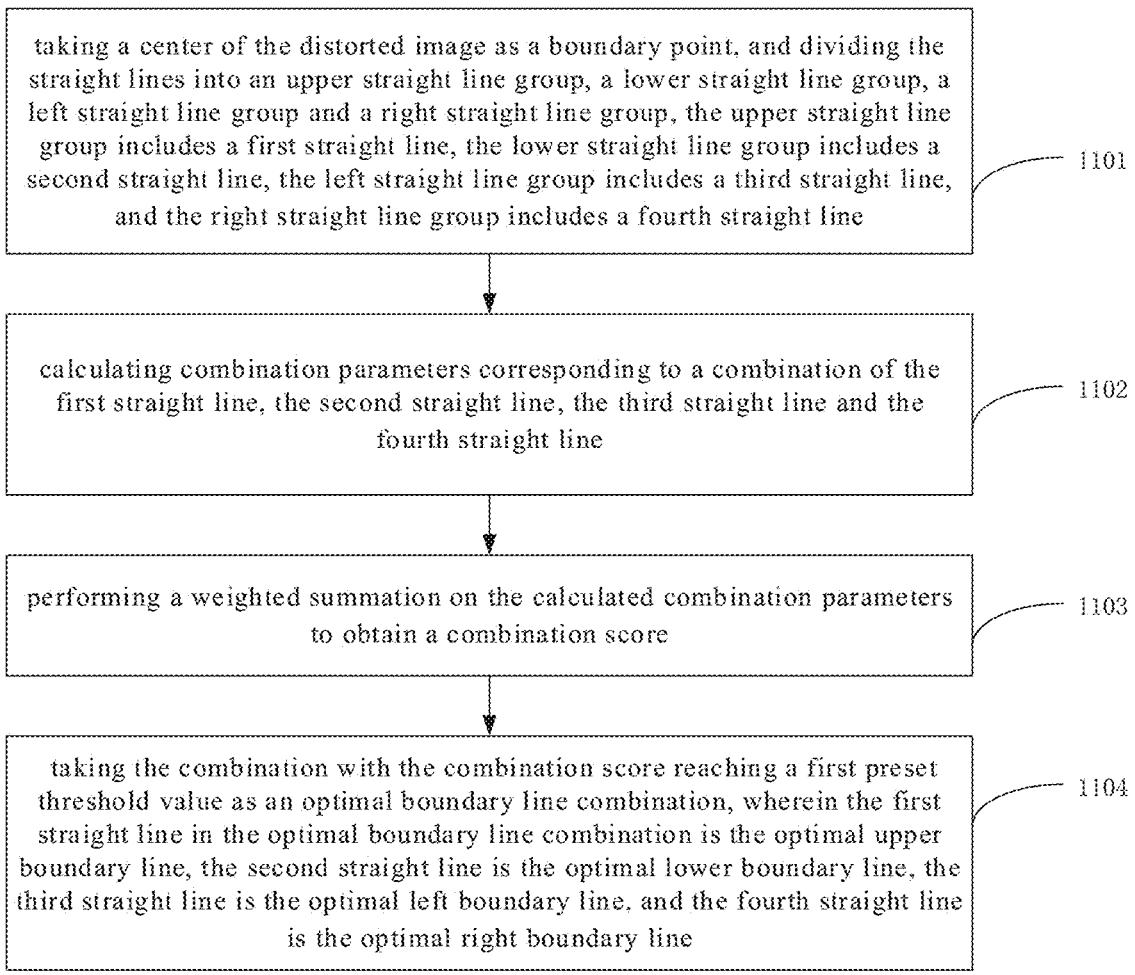
FIG. 11 is a flowchart illustrating steps for determining optimal boundary lines in an embodiment of the present disclosure.

In an implementation, referring to FIG. 11, the step 102 may specifically include:

Step 1101: taking a center of the distorted image as a boundary point, and dividing the straight lines into an upper straight line group, a lower straight line group, a left straight line group and a right straight line group, the upper straight line group includes a first straight line, the lower straight line group includes a second straight line, the left straight line group includes a third straight line, and the right straight line group includes a fourth straight line.

Specifically, the center of the distorted image may be used as the boundary point, the merged horizontal group may be divided into an upper straight line group topLineSet and a lower straight line group bottomlineSet, and the merged vertical group may be divided into a left straight line group leftLineSet and a right straight line group rightLineSet.

The first straight line is any straight line in the upper straight line group, the second straight line is any straight line in the lower straight line group, the third straight line is any straight line in the left straight line group, and the fourth straight line is any straight line in the right straight line group.

Accordingly, the step 103 may specifically include step 1102 to step 1104.

Step 1102: calculating combination parameters corresponding to a combination of the first straight line, the second straight line, the third straight line and the fourth straight line, where the combination parameters include at least one of following parameters: a parallelism between the first straight line and the second straight line, a parallelism between the third straight line and the fourth straight line, an area of a figure formed by the first straight line, the second straight line, the third straight line and the fourth straight line, and a matching degree between the figure and a preset figure.

Step 1103: performing a weighted summation on the calculated combination parameters to obtain a combination score.

Step 1104: taking the combination with the combination score reaching a first preset threshold value as an optimal boundary line combination, where the first straight line in the optimal boundary line combination is the optimal upper boundary line, the second straight line is the optimal lower boundary line, the third straight line is the optimal left boundary line, and the fourth straight line is the optimal right boundary line.

Specifically, any straight line in each group of topLineSet, bottomLineSet, leftLineSet and rightLineSet may be taken, and combination parameters such as an area of a figure formed by four straight lines, a matching degree between the figure and a preset figure, and a parallelism between two opposite straight lines are calculated; weighted summation is performed on the obtained combination parameters to obtain a combination score; the combination with the combination score reaching a first preset threshold (for example, the combination score is the highest) is determined as the optimal boundary line combination, and the four straight lines in the combination are determined as the optimal boundary lines. The optimal boundary lines of the distorted image may include, for example, the optimal upper boundary line lineTop, the optimal lower boundary line lineBottom, the optimal left boundary line lineLeft, and the optimal right boundary line lineRight.

The straight lines obtained by the LSD are screened by grouping the straight lines into the horizontal group and the vertical group, merging parallel straight lines, and determining optimal boundary lines, so that interference straight lines are removed and four initial vertexes are obtained.

Figure 12:
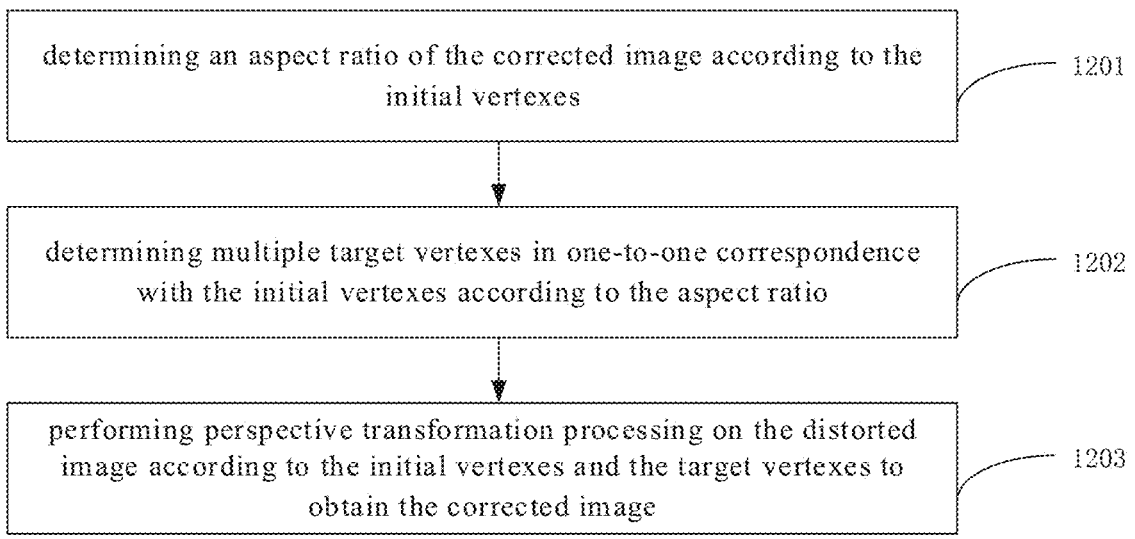
FIG. 12 is a flowchart illustrating steps of perspective transformation process provided by an embodiment of the present disclosure.

In an implementation, referring to FIG. 12, the step 105 may specifically, include steps 1201 to 1203.

Step 1201: determining an aspect ratio of the corrected image according to the initial vertexes.

In specific implementations, multiple side lengths of the distorted image can be determined according to positions of the initial vertexes; and the aspect ratio is determined according to the side lengths and an included angle between the distorted image and the horizontal axis.

Further, an initial height and an initial width of the distorted image can be determined according to the side lengths; the initial height and the initial width are corrected according to the included angle between the distorted image and the horizontal axis to obtain a corrected height and a corrected width; a ratio of the corrected height to the corrected width is determined as the aspect ratio.

Figure 13:
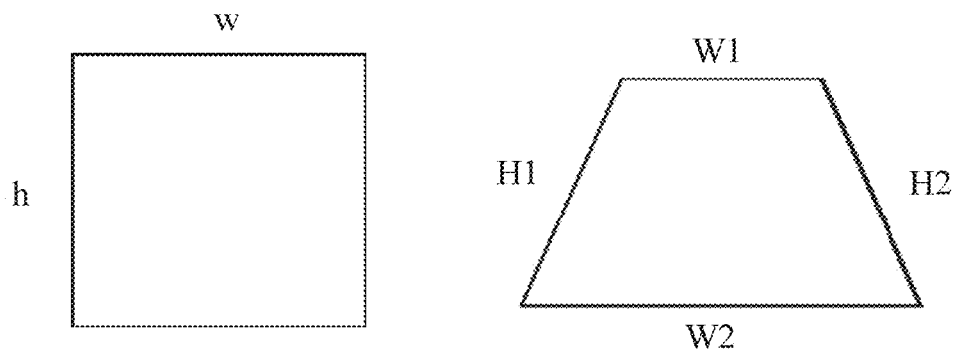
FIG. 13 is a diagram illustrating that a rectangle is distorted into a general quadrilateral in an embodiment of the present disclosure.

A method of estimating the aspect ratio will be described below by taking FIG. 13 as an example. Assuming that a rectangle is distorted to become a general quadrilateral, four sides of the general quadrilateral are respectively H1, W1, H2 and W2, and the initial height H and the initial width W of the quadrilateral are estimated according to the side lengths as follows.

$$H=\sqrt{H1*H2}$$

$$W=\sqrt{W1 \times W2}$$

An included angle θ between the distorted image and the vertical axis (perpendicular to the horizontal axis) is calculated according to formulas $$\frac{Hr}{D} \approx 2* \tan\left(\frac{\alpha}{2}\right) * \frac{H}{H_{max}} \text{ and } \frac{D - \frac{1}{2}*H_r*\sin\theta}{D + \frac{1}{2}*H_r*\sin\theta} = \frac{W_1}{W_2},$$

where Ht indicates a physical size of the real object, D indicates a distance from, for example, a camera to the real object, $H_{max}$ indicates the maximum height of the distorted image, α indicates the taking angle, for example, about 60 degrees.

The initial height H and the initial width W are corrected according to the included angle θ, to obtain the corrected height H' and the corrected width W', i.e., $$H' = \frac{H}{\cos\theta} \text{ and } = W'\frac{W}{\cos\beta},$$

where β indicates the included angle between the distorted image and the horizontal axis.

The ratio of the corrected height to the corrected width is determined as the aspect ratio $$\text{ratio} = \frac{H'}{W'}.$$

Here, the included angle between the distorted image and the horizontal axis may refer to, for example, an included angle between an image of a vertical axis of the real object in the distorted image and the horizontal axis, and a sum of the included angle between the distorted image and the horizontal axis and the included angle between the distorted image and the vertical axis equals to 90 degrees, that is, the included angle between the distorted image and the horizontal axis and the included angle between the distorted image and the vertical axis are complementary.

Step 1202: determining multiple target vertexes in one-to-one correspondence with the initial vertexes according to the aspect ratio.

Specifically, the target vertexes in one-to-one correspondence with the initial vertexes may be determined based on the side lengths of the distorted image and the aspect ratio of the corrected image.

As above, four vertexes, namely pLeftTop, pLeftBottom, pRightTop and pRightBottom are obtained, a distance between pLeftBottom and pRightBottom is calculated to be the width, the height of the corrected image is calculated according to height=ratio*width, and positions of the four target vertexes in one-to-one correspondence with the four initial vertexes are respectively determined so that the upper left target vertex is at pLeftTop_new (0, 0), the lower left target vertex is at pLeftBottom_new (0, height), the upper right target vertex is at pRightTop_new (width, 0) and the lower right target vertex is at pRightBottom_new (width, height).

It should be noted that, here, the height is determined according to the aspect ratio and the width (e.g., the distance between pLeftBottom and pRightBottom), but the width can also be determined according to the aspect ratio and the height (e.g., the distance between LeftTop and pLeftBottom).

Step 1203: performing a perspective transformation processing on the distorted image according to the initial vertexes and the target vertexes to obtain the corrected image.

Specifically, a perspective transformation matrix may be determined first according to positions of the initial vertexes and the target vertexes; and then the perspective transformation processing is performed on the distorted image by using the perspective transformation matrix.

Figure 14:
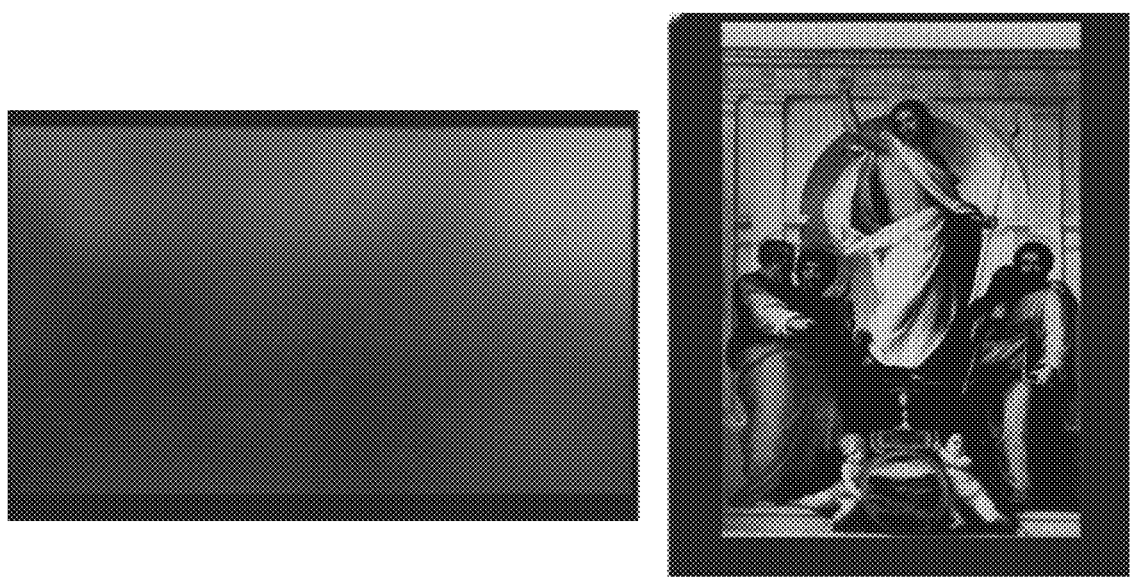
FIG. 14 is a schematic diagram of a corrected image in an embodiment of the present disclosure.

The perspective transformation matrix may be obtained from four initial vertexes and four target vertexes matched with the initial vertexes, and used for performing the perspective transformation processing on the distorted image, so as to obtain the corrected image as shown in FIG. 14.

Figure 15:
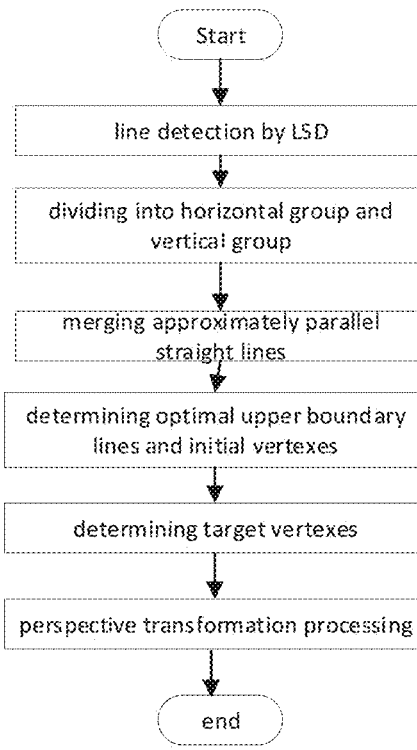
FIG. 15 is a flowchart illustrating a distortion correction method provided in an embodiment of the present disclosure.

In the present application, the distorted image is processed, and the distortion of the distorted image relative to the real object caused by the taking angle and the taking position is corrected. As shown in FIG. 15, the present disclosure may implement a correction on the distorted image through an LSD line detection, dividing detected lines into horizontal and vertical groups, merging approximate parallel lines, determining optimal boundary lines and initial vertexes, determining target vertexes, and perspective transformation processing. According to technical solutions of the present application, multiple straight lines in the distorted image can be accurately and quickly detected, so that the vertexes of the image are obtained, and a relatively real corrected image is obtained; automatic vertex detection and correction are realized, and an automatic correction of the distorted image is realized; the universality for ARM platforms is optimized, and the selection of the boundary lines and the vertexes is optimized, resulting in an improved code efficiency; in addition, an estimation of the aspect ratio is added in the perspective transformation processing, resulting in a strong practicability. Compared with traditional technical solutions (such as scanning software), the corrected image obtained by the technical solution of the present application has a small distortion, resulting in a greatly improved correction effect.

Figure 16:
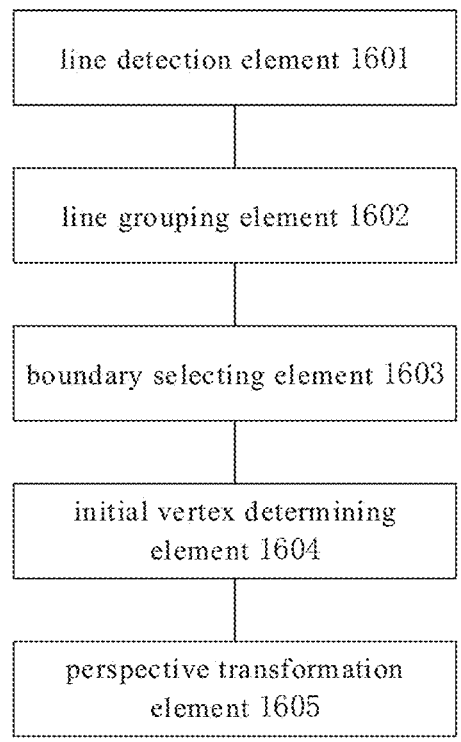
FIG. 16 is a block diagram illustrating a configuration of a distortion correction apparatus according to an embodiment of the present disclosure.

Another embodiment of the present disclosure provides a distortion correction apparatus, as shown in FIG. 16, which may include:
- a line detection element 1601 configured to perform a line detection on a distorted image to obtain multiple straight lines in the distorted image;
- a line grouping element 1602 configured to group the straight lines into multiple groups of straight lines;
- a boundary selecting element 1603 configured to select optimal boundary lines of the distorted image from the groups of straight lines;

an initial vertex determining element 1604 configured to determine multiple initial vertexes of the distorted image according to intersection points between the optimal boundary lines;

a perspective transformation element 1605 configured to perform a perspective transformation processing on the distorted image according to the initial vertexes to obtain a corrected image.

With regard to the apparatus in the above embodiment, specific implementations of operations performed by each element have been described in detail in the embodiment related to the distortion correction method, and will not be described in detail here.

Another embodiment of the present disclosure provides an electronic device, including:

a processor;

a memory for storing instructions executable by the processor;

wherein the processor is configured to execute the instructions to implement the distortion correction method of the above embodiment.

Another embodiment of the present disclosure provides a computer-readable storage medium storing instructions, which; when executed by a processor of an electronic device, enables the electronic device to perform the distortion correction method of the above embodiment.

An embodiment of the present disclosure provides a distortion correction method, a distortion correction apparatus, an electronic device, and a computer-readable storage medium, the distortion correction method including: performing a line detection on a distorted image to obtain multiple straight lines in the distorted image; grouping the straight lines into multiple groups of straight lines; selecting optimal boundary lines of the distorted image from the groups of straight lines; determining multiple initial vertexes of the distorted image according to intersection points between the optimal boundary lines; and performing a perspective transformation processing on the distorted image according to the initial vertexes to obtain a corrected image. According to the technical solutions of the present disclosure, automatic correction is achieved, the optimal boundary lines are selected from the multiple detected straight lines, interference straight lines are removed, the vertexes of the image are determined according to the optimal boundary lines, the corrected image is much similar to the real object, and a quality of the corrected image is improved.

The embodiments in the present application are described in a progressive manner, and each embodiment focuses on features different from those of other embodiments, and the same or similar parts in the embodiments are referred to each other.

Finally, it should be noted that, in the present disclosure, relational terms such as first and second, and the like are used solely to distinguish one entity or action from another entity or action without necessarily requiring or implying any actual such relationship or order between such entities or actions. Also, the terms "includes", "including" or any other variation thereof are intended to cover a non-exclusive inclusion, such that a process, a method, an article, or an apparatus that includes a list of elements not only include those elements but also include other elements not expressly listed or inherent to such process, method, article, or apparatus. Without further limitation, an element defined by the phrase "comprising an . . . " does not exclude the presence of other identical elements in the process, method, article, or apparatus that includes the element.

The distortion correction method, the distortion correction apparatus, the electronic device, and the computer-readable storage medium provided in the present disclosure are described in detail above, and specific examples are applied herein to explain principles and implementations of the present disclosure, and the descriptions of the above embodiments are only used to help to understand the method and a core idea of the present disclosure; while various changes to the embodiments and applications will be apparent to those skilled in the art based on a concept of the present disclosure, and it is not intended to limit the present disclosure to the details shown.

The invention claimed is:

1. A distortion correction method, comprising:

performing a line detection on a distorted image to obtain multiple straight lines in the distorted image:

grouping the straight lines into multiple groups of straight lines;

selecting optimal boundary lines of the distorted image from the groups of straight lines;

determining multiple initial vertexes of the distorted image according to intersection points between the optimal boundary lines;

performing a perspective transformation processing on the distorted image according to the initial vertexes to obtain a corrected image, wherein the optimal boundary lines comprise an optimal upper boundary line, an optimal lower boundary line, an optimal left boundary line, and an optimal right boundary line, and the determining the initial vertexes of the distorted image according to the intersection points between the optimal boundary lines comprises:

determining the intersection point of the optimal left boundary line and the optimal upper boundary line as an upper left initial vertex, determining the intersection point of the optimal upper boundary line and the optimal right boundary line as an upper right initial vertex, determining the intersection point of the optimal right boundary line and the optimal lower boundary line as a lower right initial vertex, and determining the intersection point of the optimal lower boundary line and the optimal left boundary line as a lower left initial vertex.

2. The method of claim 1, wherein the performing the line detection on the distorted image to obtain the straight lines in the distorted image comprises:

performing the line detection on the distorted image by using a line segment detector (LSD) to obtain the straight lines in the distorted image.

3. The method of claim 1, wherein grouping the plurality of lines into a plurality of line groups comprises:

dividing the straight lines into an upper straight line group, a lower straight line group, a left straight line group and a right straight line group by taking a center of the distorted image as a boundary point, wherein the upper straight line group comprises a first straight line, the lower straight line group comprises a second straight line, the left straight line group comprises a third straight line, and the right straight line group comprises a fourth straight line;

the selecting the optimal boundary lines of the distorted image from the groups of straight lines comprises:

calculating combination parameters corresponding to a combination of the first straight line, the second straight line, the third straight line and the fourth straight line, wherein the combination parameters include at least one of following parameters: a parallelism between the first straight line and the second straight line, a parallelism between the third straight line and the fourth straight line, an area of a figure formed by the first straight line, the second straight line, the third straight line and the fourth straight line, and a matching degree between the figure and a preset figure;

performing a weighted summation on the combination parameters to obtain a combination score;

taking the combination with the combination score reaching a first preset threshold value as an optimal boundary line combination, wherein the first straight line in the optimal boundary line combination is the optimal upper boundary line, the second straight line is the optimal lower boundary line, the third straight line is the optimal left boundary line, and the fourth straight line is the optimal right boundary line.

4. The method of claim 3, further comprising:

dividing the straight lines into a horizontal group and a vertical group according to an included angle between each of the straight lines and a horizontal axis before dividing the straight lines into the upper straight line group, the lower straight line group, the left straight line group and the right straight line group by taking the center of the distorted image as the boundary point;

calculating an included angle of any two straight lines in each of the horizontal group and the vertical group;

in response to that the included angle between the two straight lines is smaller than or equal to a second preset threshold value, calculating a second distance between the two straight lines;

in response to that the second distance is smaller than or equal to a third preset threshold, merging the two straight lines;

the dividing the straight lines into the upper straight line group, the lower straight line group, the left straight line group, and the right straight line group by taking the center of the distorted image as the boundary point comprises:

dividing the horizontal group subjected to the merging into the upper straight line group and the lower straight line group and dividing the vertical group subjected to the merging into the left straight line group and the right straight line group by taking the center of the distorted image as the boundary point.

5. An electronic device, comprising:

a processor;

a memory configured to store instructions executable by the processor;

wherein the processor is configured to execute the instructions to implement the distortion correction method of claim 1.

6. A non-transient computer readable storage medium storing instructions, which, when executed by a processor of an electronic device, enable the electronic device to perform the distortion correction method of claim 1.

7. A distortion correction method, comprising;

performing a line detection on a distorted image to obtain multiple straight lines in the distorted image;

grouping the straight lines into multiple groups of straight lines;

selecting optimal boundary lines of the distorted image from the groups of straight lines;

determining multiple initial vertexes of the distorted image according to intersection points between the optimal boundary lines;

performing a perspective transformation processing on the distorted image according to the initial vertexes to obtain a corrected image, wherein the determining the initial vertexes of the distorted image according to the intersection points between the optimal boundary lines comprises:

calculating a total number of intersection points between every two of the optimal boundary lines;

determining the initial vertexes of the distorted image from the intersection points according to the total number of the intersection points and a preset rule.

8. The method of claim 7, wherein the intersection points comprise a first intersection point and a second intersection point, the first intersection point and the second intersection point are obtained by intersecting identical two of the optimal boundary lines, and the calculating the total number of the intersection points between the every two of the optimal boundary lines comprises:

calculating a first distance between the first intersection point and the second intersection point;

in response to that the first distance is smaller than or equal to a distance threshold value, merging the first intersection point and the second intersection point into one intersection point.

9. An electronic device, comprising:

a processor;

a memory configured to store instructions executable by the processor;

wherein the processor is configured to execute the instructions to implement the distortion correction method of claim 7.

10. A non-transient computer readable storage medium storing instructions, which, when executed by a processor of an electronic device, enable the electronic device to perform the distortion correction method of claim 7.

11. The method of claim 7, wherein grouping the plurality of lines into a plurality of line groups comprises:

dividing the straight lines into an upper straight line group, a lower straight line group, a left straight line group and a right straight line group by taking a center of the distorted image as a boundary point, wherein the upper straight line group comprises a first straight line, the lower straight line group comprises a second straight line, the left straight line group comprises a third straight line, and the right straight line group comprises a fourth straight line;

the selecting the optimal boundary lines of the distorted image from the groups of straight lines comprises:

calculating combination parameters corresponding to a combination of the first straight line, the second straight line, the third straight line and the fourth straight line, wherein the combination parameters include at least one of following parameters: a parallelism between the first straight line and the second straight line, a parallelism between the third straight line and the fourth straight line, an area of a figure formed by the first straight line, the second straight line, the third straight line and the fourth straight line, and a matching degree between the figure and a preset figure;

performing a weighted summation on the combination parameters to obtain a combination score;

taking the combination with the combination score reaching a first preset threshold value as an optimal boundary line combination, wherein the first straight line in the optimal boundary line combination is the optimal upper boundary line, the second straight line is the optimal lower boundary line, the third straight line is the optimal left boundary line, and the fourth straight line is the optimal right boundary line.

12. A distortion correction method, comprising:
performing a line detection on a distorted image to obtain multiple straight lines in the distorted image;
grouping the straight lines into multiple groups of straight lines;
selecting optimal boundary lines of the distorted image from the groups of straight lines;
determining multiple initial vertexes of the distorted image according to intersection points between the optimal boundary lines;
performing a perspective transformation processing on the distorted image according to the initial vertexes to obtain a corrected image,
wherein the performing a perspective transformation processing on the distorted image according to the initial vertexes to obtain the corrected image comprises:
determining an aspect ratio of the corrected image according to the initial vertexes;
determining multiple target vertexes in one-to-one correspondence to the initial vertexes according to the aspect ratio;
performing the perspective transformation processing on the distorted image according to the initial vertexes and the target vertexes to obtain the corrected image.

13. The method of claim 12, wherein the determining the aspect ratio of the corrected image according to the initial vertexes comprises:
determining side lengths of the distorted image according to positions of the initial vertexes;
determining the aspect ratio according to the side lengths and an included angle between the distorted image and a horizontal axis.

14. The method of claim 13, wherein the determining the aspect ratio according to the side lengths and the included angle between the distorted image and the horizontal axis comprises:
determining an initial height and an initial width of the distorted image according to the side lengths;
correcting the initial height and the initial width according to the included angle between the distorted image and the horizontal axis to obtain a corrected height and a corrected width;
determining a ratio of the corrected height to the corrected width as the aspect ratio.

15. The method of claim 12, wherein the determining the target vertexes in one-to-one correspondence with the initial vertexes according to the aspect ratio comprises:
determining the target vertexes in one-to-one correspondence with the initial vertexes according to the side lengths and the aspect ratio of the distorted image.

16. The method of claim 12, wherein the performing perspective transformation processing on the distorted image according to the initial vertexes and the target vertexes comprises:

determining a perspective transformation matrix according to positions of the initial vertexes and the target vertexes;
performing perspective transformation processing on the distorted image by using the perspective transformation matrix.

17. An electronic device, comprising:
a processor;
a memory configured to store instruction executable by the processor;
wherein the processor is configured to execute the instructions to implement the distortion correction method of claim 12.

18. A non-transient computer readable storage medium storing instructions, which, when executed by a processor of an electronic device, enable the electronic device to perform the distortion correction method of claim 12.

19. The method of claim 12, wherein the performing the line detection on the distorted image to obtain the straight lines in the distorted image comprises:
performing the line detection on the distorted image by using a line segment detector (LSD) to obtain the straight lines in the distorted image.

20. The method of claim 12, wherein grouping the plurality of lines into a plurality of line groups comprises:
dividing the straight lines into an upper straight line group, a lower straight line group, a left straight line group and a right straight line group by taking a center of the distorted image as a boundary point, wherein the upper straight line group comprises a first straight line, the lower straight line group comprises a second straight line, the left straight line group comprises a third straight line, and the right straight line group comprises a fourth straight line;
the selecting the optimal boundary lines of the distorted image from the groups of straight lines comprises:
calculating combination parameters corresponding to a combination of the first straight line, the second straight line, the third straight line and the fourth straight line, wherein the combination parameters include at least one of following parameters: a parallelism between the first straight line and the second straight line, a parallelism between the third straight line and the fourth straight line, an area of a figure formed by the first straight line, the second straight line, the third straight line and the fourth straight line, and a matching degree between the figure and a preset figure;
performing a weighted summation on the combination parameters to obtain a combination score;
taking the combination with the combination score reaching a first preset threshold value as an optimal boundary line combination, wherein the first straight line in the optimal boundary line combination is the optimal upper boundary line, the second straight line is the optimal lower boundary line, the third straight line is the optimal left boundary line, and the fourth straight line is the optimal right boundary line.

* * * * *